US005653347A

United States Patent [19]

Larsson

[11] Patent Number: 5,653,347

[45] Date of Patent: Aug. 5, 1997

[54] CYCLONE SEPARATOR

[75] Inventor: Karl-Erik Larsson, Hägersten, Sweden

[73] Assignee: Cyclotech AB, Sweden

[21] Appl. No.: 360,676

[22] PCT Filed: Jun. 29, 1993

[86] PCT No.: PCT/SE93/00592

§ 371 Date: Mar. 16, 1995

§ 102(e) Date: Mar. 16, 1995

[87] PCT Pub. No.: WO93/00242

PCT Pub. Date: Jan. 6, 1994

[30] Foreign Application Priority Data

Jun. 30, 1992 [SE] Sweden ................................ 9202008

[51] Int. Cl.[6] ............................ B04C 5/14; B01D 21/26

[52] U.S. Cl. ...................... 209/727; 209/733; 210/512.1; 210/788

[58] Field of Search .................................. 209/208, 210, 209/724, 725, 727, 733; 210/512.1, 788; 55/459.1

[56] References Cited

U.S. PATENT DOCUMENTS

| | | | |
|---|---|---|---|
| 3,399,770 | 9/1968 | Salomon | 209/727 |
| 3,800,946 | 4/1974 | Reid et al. | 209/733 X |
| 4,510,056 | 4/1985 | Frykhult et al. | 209/733 X |
| 5,116,519 | 5/1992 | Michaluk | 210/788 |
| 5,437,794 | 8/1995 | Andersson | 210/512.1 |

FOREIGN PATENT DOCUMENTS

| | | | |
|---|---|---|---|
| 9217260 | 10/1992 | WIPO | 210/512.1 |

*Primary Examiner*—William E. Terrell
*Assistant Examiner*—Tuan Nguyen

[57] ABSTRACT

A cyclone separator for separating substances from a fibre-liquid-suspension, particularly a paper pulp suspension, wherein the separator has a main part (3) which includes an inner conical chamber (4) that has a generally tangentially directed inlet at the wider end (5) of the chamber, and in which the chamber (4) tapers conically downwards. The inner surface of the chamber has a screw-like configuration characterized by a helix. The screw-like inner surface includes a first upper surface or flank (1) facing towards the wider end of the chamber and a second, lower surface or flank (2) facing towards the narrower end (6) of the chamber. The flank (1) defines an angle α with the chamber center line and the second flank (2) defines an angle γ with the first flank (1). The second flank (2) and its extension together with the first flank (1) on the nearest underlying part of the helix or screw-thread define a triangle that has a line which extends through the apex of the nearest underlying part of the helix.

5 Claims, 2 Drawing Sheets

CYCLONE SEPARATOR

FIELD OF INVENTION

The present invention relates to a cyclone separator for separating substances from a fibre-liquid-suspension, particularly paper pulp suspensions, of the kind defined in the preamble of the following claim 1.

BACKGROUND OF THE INVENTION

Cyclones of the kind used in the paper industry to cleanse a paper pulp suspension from contaminants and impurities in the form of sand grains, metal particles, chips, splinters and larger metal objects, such as paper clips and paper staples that are liable to be contained by paper pulp produced from wastepaper will typically comprise an elongated cyclone chamber which tapers in a direction towards one end thereof and which is provided at its wider end with a tangentially directed inlet for the suspension to be cleaned and an axially directed outlet for cleaned suspension, the accept, and which further includes an axially directed second outlet for the contaminants or impurities, i.e. the reject.

A cyclone separator of this kind operates in the following manner:

The suspension to be cleaned is fed at high speed into the chamber, through the tangentially directed inlet provided in the upper, wider part of the chamber. The input suspension thereby moves helically or spirally on the inner surface of the wall of the separator, in a direction towards the opposite, narrower end of the chamber, i.e. towards the axially directed second outlet. The heavier particles in the suspension, i.e. the contaminants, endeavour to collect against the wall of the cyclone, while the lighter particles, i.e. the fibres, collect in the centre of the cyclone. The contaminants are moved down into the tapering or narrowing part of the cyclone and exit therefrom through the axially directed second outlet. The inner part of the vortex, on the other hand, turns at the lower end of the tapering part of the cyclone and moves axially in an opposite direction, forming a helical or spiralling vortex, and leaves the cyclone through the upper end thereof in the form of a light, clean fraction called the accept. Thus, when cleansing paper pulp suspensions, the accept will essentially contain fibres of the desired nature.

The cyclone chamber of those cyclone separators known hitherto for cleansing paper pulp suspensions have an inner wall which is either smooth or is provided with helically extending screw grooves which facilitate movement of the coarser and heavier contaminants down towards the bottom outlet of the cyclone, as illustrated for instance in Prior Publication U.S. Pat. No. 3,399,770.

During the coarse of cleaning and separating contaminants from the fibre suspension, an individual particle will move in a circular path around the inner wall of the conical chamber without shifting axially. The particle is held in suspension by buoyancy and entraining forces. The buoyancy forces acting on the particle tend to counteract the entraining forces that endeavour to move the particle axially and thus hold the particle in suspension. The particle thus continuously moves on the same level. The particle is also subjected to a centrifugal force, such that the particle will be held against the inner chamber wall and move around the wall in a closed circular path. Thus, the particle will cut into the surface of the inner wall as it moves therearound. The effect of these particles on the inner chamber wall will gradually wear the wall to a state in which it must be repaired or replaced.

The various cyclone separators described in the afore-said patent specification are intended to eliminate this drawback.

However, this earlier known construction is intended to remove contaminants that are found in typical paper pulp suspensions, such as sand, bark and the like.

The present invention, on the other hand, is intended to remove effectively primarily the kind of contaminants that are found in paper pulp which is produced, e.g., from recycled paper, such as paper clips, staples and other heavier particles. The extraction of such contaminants places completely different requirements on cyclone construction.

SUMMARY OF THE INVENTION

The main object of the present invention is to provide a cyclone separator which will effectively extract heavy particles from a fibre suspension.

Another object of the invention is to provide a cyclone separator which will have a long useful life.

A further object of the invention is to provide a cyclone separator which will have few operational breakdowns.

Still another object of the invention is to provide a cyclone separator which will achieve a fully satisfactory cleansing result.

Yet another object of the invention is to provide a cyclone separator which will enable both heavy reject and light reject to be separated more effectively, i.e. a separator which can be readily constructed for the extraction of heavy contaminants and for the extraction of light contaminants in manufacture.

These objects are achieved in accordance with the invention with a cyclone separator having the characteristic features set forth in the characterizing clause of claim 1 and also in the characterizing clauses of respective subordinate claims.

Another positive effect achieved with the invention is that by increasing the angle $\alpha$ and the pitch S, the liquid flow inwardly of the inclined plane can be urged closer to the gas core that is generated in the centre of the chamber. This is highly beneficial when wishing to separate light particles, so-called light reject. These particles are influenced by centripetal forces and are drawn into the centre of the cyclone. The flank of the helical screw groove assists in "pushing" these light particles in towards the centre, where they are separated.

BRIEF DESCRIPTION OF THE DRAWINGS

The invention will now be described in more detail with reference to the accompanying drawings, in which.

DETAILED DESCRIPTION OF A PREFERRED EMBODIMENT OF THE INVENTION

Figure 1:
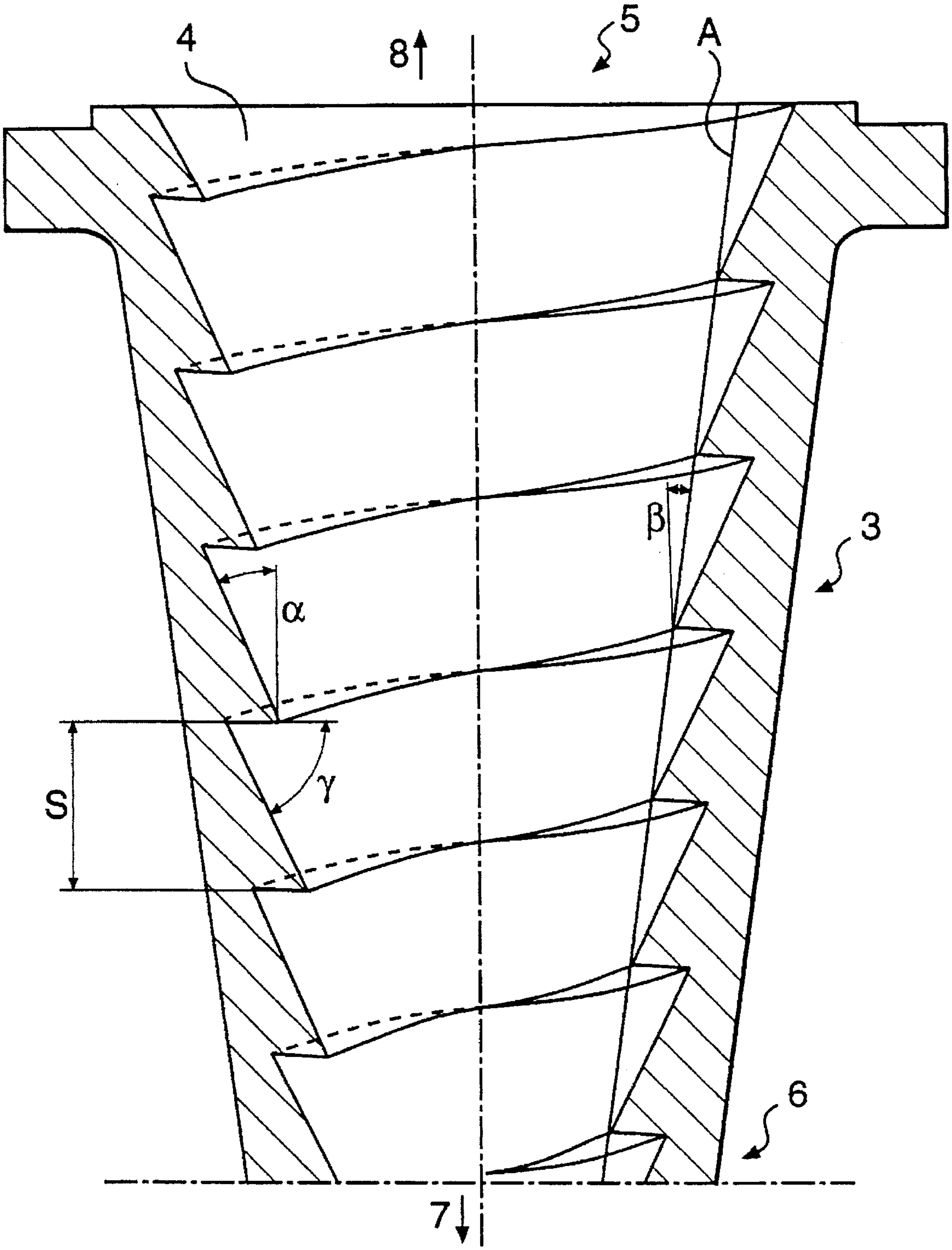
FIG. 1 is a vertical sectioned view of an inventive cyclone separator as seen on line 1—1 of FIG 3.

FIG. 1 illustrates a vertically mounted inventive cyclone separator and is a sectioned view of the separator taken in a vertical plane. The cyclone separator includes a main part 3 which has an inner, conical chamber 4 which includes an essentially tangential inlet 5*a* at the wider end 5 of the chamber. The chamber 4 tapers downwardly and its inner wall has a screw-like configuration. This screw-like configuration includes a first upper surface or flank 1 and a second, lower surface or flank 2. The reference sign α identifies the angle between the first surface or flank 1, i.e. the flank that faces towards the wider end 5 of the chamber 4, and a line that extends parallel with the centre line of the main cyclone part. The reference sign β identifies the angle between a line that extends parallel with the centre line of the main cyclone part and a conical, inner imaginary surface A that rests on the crests of the helical screw-like configuration.

The second flank 2 faces towards the narrower end 6 of the cyclone chamber and defines an angle τ with the first flank 1. This angle γ will preferably lie within the range (90° −α) −90°. The reference S identifies the pitch of the helical thread. The pitch may vary according to requirements and the area of use.

The second flank 2 and its extension form together with the first flank 1 of the nearest underlying screw-thread a triangle which has a line A that passes through the apex or crest of the nearest helical screw-thread located therebeneath, longitudinally of the chamber.

Figure 2:
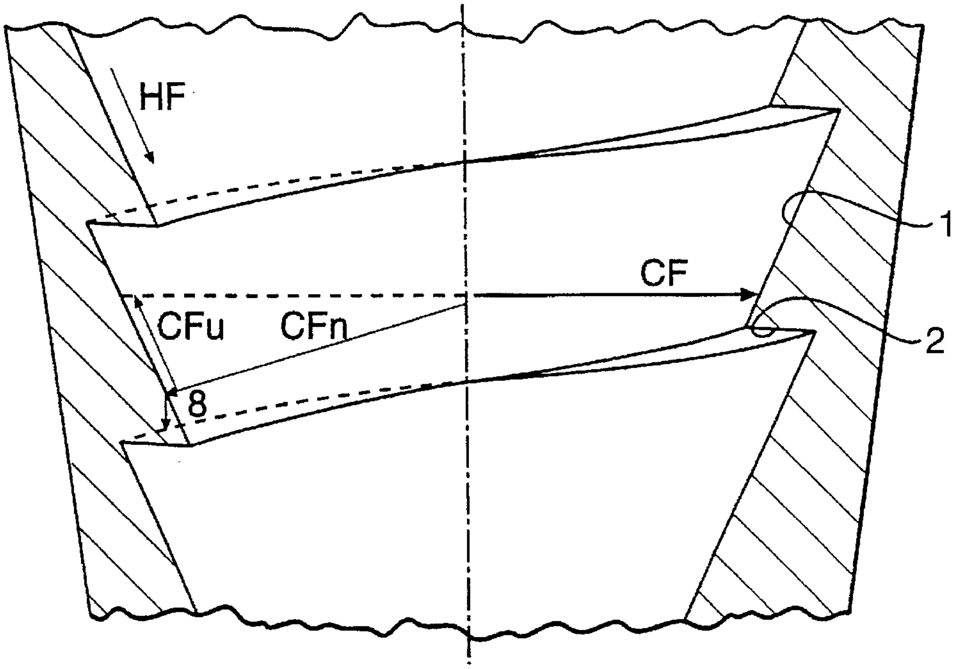
FIG. 2 illustrates the different force components of forces generated in an inventive cyclone separator.
Figure 3:
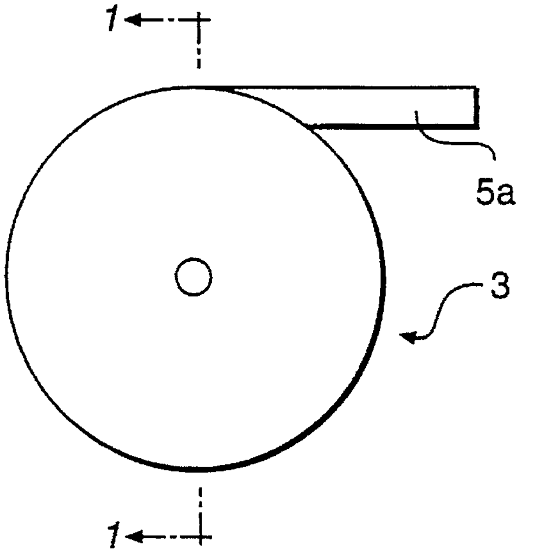
FIG. 3 is a schematic plan view of the inventive cyclone separator.

FIG. 2 illustrates the different forces that are generated in an inventive cyclone separator. CF represents the centrifugal force acting on a particle adjacent the inner chamber wall at the first flank. This force can be divided into two components, CFn and CFu, wherein CF=CFn+CFu. CFN acts perpendicularly to the flank and CFu acts in a direction in which the particle is pressed up to the "ceiling" of the helical screw-thread or helix, i.e. said second flank 2. HF represents the downwardly acting force of the liquid flow, this force acting from the wider end of the chamber in a direction opposite to CFu. The particle is also subjected to the force of gravity G. The force of gravity, however, is negligible in this connection.

If HF=CFu, the particle will travel in a horizontal orbit end will sooner or later strike "the ceiling" of the helical screw-thread and accompany the screw-thread downwards, since the screw-thread has a downwardly extending helical form.

If CFu is greater than HF, the particle will reach the "ceiling" earlier, as the particle will then slide upwards along the first flank. If CFu is smaller than HF, the particle will slide downwards on the inclined plane 1 and eventually reach the apex of the flank 2, whereafter the particle is pressed-in beneath the "ceiling". This means that heavy particles that lie against the "ceiling" of the screw-thread are more protected against the back suction effect of the gas core, since the pressure is lowest in the centre of the cyclone and greatest at the cyclone wall. If the particle rotates at a slower speed, this pressure distribution would cause the particle to be sucked in towards the centre and accompany the upwardly flowing accept.

As a result of this configuration of the inner cyclone wall, the heavy particles will be moved up towards the screw flank extending helically along the inner cyclone wall and slide down along the inclined surface of the helical screw-thread or helix, so as to reach ultimately the lower cutlet end 7 of the cyclone, at the same time as the accept outlet β is located in the centre of the wider end 5 of the chamber 4.

This novel configuration of the cyclone wall thus functions as a latch hook which while permitting movement in one direction will block movement in the opposite direction. This is particularly important in the vicinity of the lower outlet 7, where the dimensions are small and the gas core lies close to the chamber wall.

When the angle a and the pitch S are increased, the liquid flow inwardly of the inclined plane or surface will be pressed closer towards the centre of the gas core. This is advantageous when wishing to extract light particles, so-called light reject. These particles are influenced by the centripetal force and drawn towards the centre of the apparatus. The conical wall causes these light particles to be moved towards the centre, where they are separated.

It will be understood that the invention is not restricted to the described and illustrated embodiment thereof and that modifications are conceivable within the scope of the following claims.

I claim:

1. A cyclone separator for separating substances from a fibre-liquid-suspension, the separator comprising a main part including an inner conical chamber having a centre line, an inner surface with a wide end, and a generally tangentially directed inlet at the wide end, the chamber tapering conically downward from the wide end and having a screw-like configuration to provide helical threads on the inner surface thereof, each of the threads of the screw-like inner surface including an upper surface and a lower surface, the upper surface facing towards the wide end of the chamber and extending at an angle α with the chamber centre line, the lower surface facing away from the wide end and intersecting with the upper surface of the next underlying thread at an angle γ, wherein the angle α is less than 45° and the angle γ lies within the range (90° −α) to 90° so that the lower thread surface acts as an inclined plane to advance downwardly particles moved against the inner surface of the chamber and under the lower thread surface.

2. A cyclone separator according to claim 1, wherein an angle β is defined between a line that extends parallel with the chamber center line and an inner imaginary surface containing the intersections of the upper and lower surfaces of the extending helical threads.

3. A cyclone separator according to claim 2, wherein the angle α is greater than the angle β.

4. A cyclone separator according to claim 1, wherein the screw-like inner surface has one or more inputs at the wide end of the chamber.

5. A cyclone separator according to claim 1 wherein the lower thread surface has a constant width over the whole of its length.

* * * * *